United States Patent [19]

Hanson et al.

[11] Patent Number: 5,483,235

[45] Date of Patent: Jan. 9, 1996

[54] STYLUS-BASED KEYBOARD KEY ARRANGEMENT

[75] Inventors: Karrie J. Hanson, Westfield; Gregory P. Kochanski, Dunellen, both of N.J.

[73] Assignee: AT&T Corp., Murray Hill, N.J.

[21] Appl. No.: 200,800

[22] Filed: Feb. 23, 1994

[51] Int. Cl.$^6$ ............................................... H03K 17/94
[52] U.S. Cl. ........................... 341/20; 341/22; 341/23
[58] Field of Search ........................... 341/20, 21, 22; 178/18, 19, 20; 364/719.02, 719.01, 709; 400/486; 340/706, 712

[56] References Cited

U.S. PATENT DOCUMENTS

| | | | |
|---|---|---|---|
| 316,686 | 4/1885 | Van Hoevenbergh | 341/22 |
| 3,698,533 | 10/1972 | Illig et al. | 197/100 |
| 3,976,840 | 8/1976 | Cleveland et al. | 341/22 |
| 4,211,497 | 7/1980 | Montgomery | 400/486 |
| 4,244,659 | 1/1981 | Malt | 400/486 |
| 4,333,097 | 6/1982 | Buric et al. | 340/712 |
| 4,555,193 | 11/1985 | Stone | 341/23 |
| 4,812,831 | 3/1989 | Laier | 341/23 |
| 4,823,294 | 4/1989 | Rouhani | 364/709 |
| 4,905,001 | 2/1990 | Penner | 341/20 |
| 4,910,504 | 3/1990 | Eriksson | 340/712 |
| 4,916,441 | 4/1990 | Gombrich | 340/712 |
| 4,954,817 | 9/1990 | Levine | 340/706 |
| 5,124,702 | 6/1992 | Van Ardenne | 341/22 |
| 5,128,672 | 7/1992 | Kaehler | 341/23 |
| 5,251,163 | 10/1993 | Rouhani | 364/709 |

FOREIGN PATENT DOCUMENTS

| | | | |
|---|---|---|---|
| WO81/02272 | 8/1981 | European Pat. Off. | B41J 5/10 |
| 0358781A1 | 9/1988 | European Pat. Off. | H01H 13/70 |
| 234953A1 | 2/1985 | German Dem. Rep. | G06F 3/023 |

OTHER PUBLICATIONS

B. J. Oommen et al., Keyboard Optimization Using Genetic Techniques, *IEEE*, 1991, pp. 726–732.
K. J. Hanson and G. Kochanski, "A Tiny Keyboard Illustrated in AT&T Marvin 100".

*Primary Examiner*—John K. Peng
*Assistant Examiner*—Ashok Mannava
*Attorney, Agent, or Firm*—Kenneth M. Brown

[57] ABSTRACT

A small, stylus-based keyboard in which the arrangement of the keys is a function of predetermined estimated probabilities of the occurrence of various possible sequences of keystrokes. Sequences of keystrokes which are estimated to have a high likelihood of occurrence result in the associated keys being placed adjacent to one another. In this manner, the ease, speed and accuracy of use of small, stylus-based keyboards may be improved. Multiple keys representing the same character may be provided to increase the likelihood that keys included in high probability sequences will be adjacent. The probability estimates may be determined based on a statistical analysis of a preselected sample of text. In addition, keys may be color-coded for ease of identification and grooves may be cut into the housing between adjacent keys for ease of stylus operation. Lights (e.g., light-emitting-diodes) may also be inserted between adjacent keys or beneath the keys for purposes of word identification or next letter prediction.

45 Claims, 4 Drawing Sheets

FIG. 1
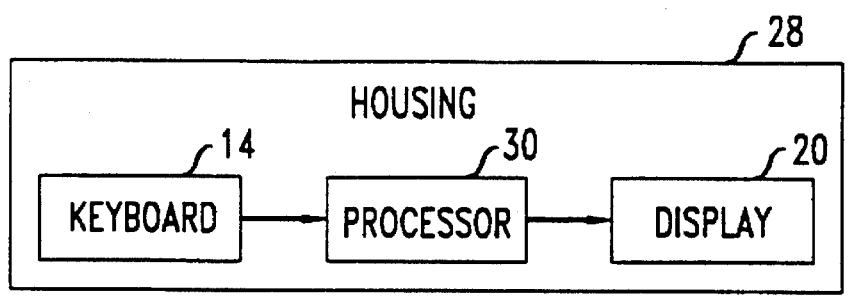
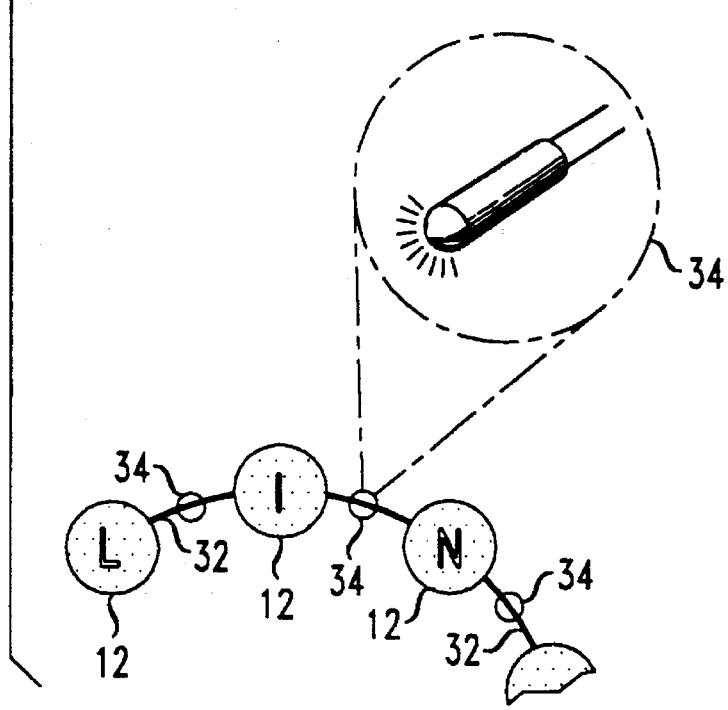

STYLUS-BASED KEYBOARD KEY ARRANGEMENT

FIELD OF THE INVENTION

The present invention relates generally to the field of alphabetic or alphanumeric keyboards for information input devices and specifically to the arrangement of keys for a stylus-based keyboard in which text is entered by touching a stylus to successive letters on the keyboard.

BACKGROUND OF THE INVENTION

As people have become more accustomed to electronic methods of communication, data manipulation and information processing in their jobs and in their personal lives, the need for portability of the electronic devices which perform these tasks has increased. One goal, for example, has been to produce quite compact devices which have the combined capabilities of a desktop or laptop computer, a cellular telephone, a fax machine, and more. Such devices are commonly referred to as personal communicators.

The technological limits of portability have often been dominated by the limitations of power supply technology—that is, by the weight and size limitations of current battery technology. However, an area that has been given less attention is the input keyboard usually associated with these devices. Most designs of portable computing devices have retained the use of the conventional "QWERTY" keyboard because of its familiarity. However, to include the QWERTY keyboard in a portable computing device limits the designer's ability to reduce the size of such a device, since sufficient width is required to accommodate two hands side by side. QWERTY keyboards which are smaller than 8 inches across tend to be very difficult to use in a touch-typing mode quickly. Thus, a one-finger "hunt and peck" action may be required. Moreover, it is necessary to take care with such small keyboards to avoid fingers touching more than one key at a time.

One approach that is presently being pursued is to eliminate the need for a keyboard altogether. In particular, portable computing devices are now available which accept handwritten input, provided with use of a stylus or similar pen-like tool. These devices make use of handwriting recognition software to interpret the user's handwritten input and to convert it to an equivalent internal representation (e.g., in ascii text form).

At least two problems result from this approach. First, the algorithmic complexity required for reasonably accurate handwriting recognition currently requires substantially more processing power than do many of the applications otherwise provided on such portable computing devices. Therefore, these devices may need to be far more costly with the use of conventional handwritten input techniques than with keyboard-based input techniques. Moreover, the power requirements for a processor capable of performing reasonably accurate handwriting recognition can be substantial.

Second, most handwriting recognition software available today has an input error rate significantly higher than that typically achievable with the use of keyboard input. Although sophisticated handwriting recognition techniques often include error correction capability, the complexity and variability of handwritten input often results in less accurate input text than does text typed in through a keyboard.

One alternative approach which has been suggested is a stylus-based keyboard design in which text is entered by touching (or otherwise coupling) a stylus to successive keys on a keyboard. A device containing such a stylus-based keyboard can be designed to be comparable in size to a device based on handwriting recognition. Moreover, it can have a much lower error rate with significantly less processing power requirements. Thus, stylus-based keyboards can allow for the construction of low-end (i.e., low cost) portable computing devices.

SUMMARY OF THE INVENTION

The present invention recognizes the fact that the ease, speed and accuracy of use of a stylus-based keyboard is limited by the distance that the stylus must travel between keys which are to be typed consecutively. Therefore, it would be advantageous to arrange the keys on a stylus-based keyboard so that keys which are more likely to be typed in immediate succession are placed in closer proximity to one another than keys which are less likely to be consecutively typed.

Specifically, the present invention provides an information input device (e.g., a keyboard) adapted for input of natural language text. The input device has a plurality of discrete areas (e.g., keys) representative of characters which can be combined to produce such text. These discrete areas are adapted to be activated by operatively coupling a stylus thereto. (The stylus may, for example, be a hand-held mechanical device or even a human finger.) The arrangement of the discrete areas on the input device is a function of predetermined estimated probabilities of the activation of one or more possible sequences of discrete areas, wherein the probabilities are a function of the natural language text.

Activation probabilities are determined for one or more sequences of discrete areas. Then, the discrete areas are arranged as a function of these probabilities. Specifically, of those sequences which have been estimated to have a likelihood of activation higher than a predetermined threshold, a majority (i.e., more than half) are selected. For each selected sequence, the corresponding discrete areas are placed "adjacent" to one another on the input device. In this manner, the ease, speed and accuracy of use of stylus-based input devices may be improved.

As used herein, the term "adjacent" is used with respect to the discrete areas on the information input device (e.g., the keys on a keyboard) to mean that the discrete areas are positioned in close proximity to each other relative to the proximity of other discrete areas thereto. Specifically, two discrete areas are defined to be adjacent if and only if the distance between their respective centers is less than or equal to 175% of the larger of (a) the distance between the center of the first of the two discrete areas and the nearest center of any other discrete area and (b) the distance between the center of the second of the two discrete areas and the nearest center of any other discrete area. (The "center" of a discrete area is the point located at the center of the smallest circle which may be circumscribed around the discrete area.) In other words, two discrete areas are adjacent if they are not more than 1.75 times as far apart as one of the two discrete areas is from its nearest "neighbor."

The probability estimates may be determined based on a statistical analysis of a preselected sample of text. In addition, keys may be color-coded for ease of identification and grooves may be cut into the housing between adjacent keys for ease of stylus operation. Lights (e.g., light-emitting-diodes) may also be inserted between adjacent keys for purposes of word identification or prediction. Moreover, multiple keys representing the same character may be provided to increase the likelihood that keys included in high probability sequences will be adjacent.

BRIEF DESCRIPTION OF THE DRAWINGS

FIG. 1 diagrams the major components of a portable computing device comprising a stylus-based keyboard with keys arranged in accordance with an illustrative embodiment of the present invention.

FIG. 3 shows a magnified view of a portion of the keyboard of the portable computing device of FIG. 2, illustrating that light-emitting-diodes are positioned between adjacent keys.

DETAILED DESCRIPTION

Figure 2:
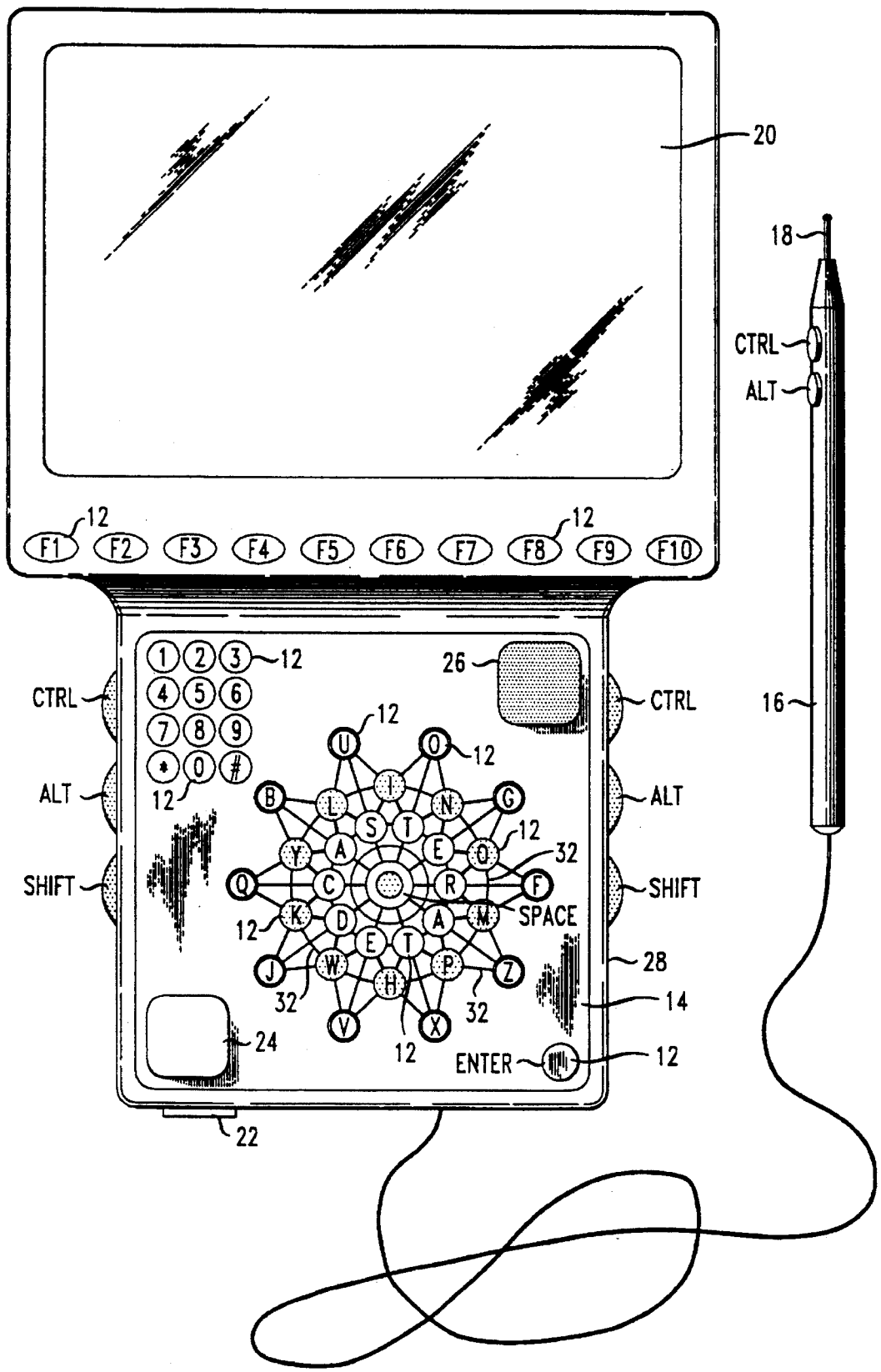
FIG. 2 shows the portable computing device of FIG. 1 in further detail.

A portable computing device comprising a stylus-based keyboard with keys arranged in accordance with an illustrative embodiment of the present invention is shown in FIGS. 1–3. FIG. 1 diagrams the major components thereof. Specifically, housing 28 contains keyboard 14, processor 30 and display device 20. Keyboard 14 serves as an input device to processor 30, and display device 20 serves as an output device from the processor. As such, both keyboard 14 and display device 20 are electrically coupled to processor 30.

As can been seen from the more detailed illustration in FIG. 2, keyboard 14 is physically mounted atop housing 28. Keys 12 of keyboard 14 comprise alphabetic letter keys representative of the letters A through Z for use in entering English language text. Also included are numeric keys representative of the digits 0 through 9, a "space" key, an "enter" key, and special function keys F1 through F10. Keyboard 14 is operated by touching stylus tip 18 of stylus 16 to a sequence of keys 12—that is, a given key is typed by touching stylus tip 18 to the key.

"Alternate" ("CALT") and "control" ("CTRL") operations may be performed by depressing a corresponding button either on one of the sides of keyboard 14 or on the body of stylus 16. The "shift" operation may be performed either by depressing a button on one of the sides of keyboard 14 or by exerting increased pressure on stylus tip 18. Any punctuation marks or other symbols that do not appear on keyboard 14 may be drawn by hand on conventional signature pad 26 and recognized by conventional handwriting recognition software. Note that handwriting recognition software whose task is limited to recognizing punctuation marks and special characters is much less complex than general handwriting recognition software. The illustrative portable computing device shown in FIG. 2 also includes display 20, mouse pad 24, phone jack 22, and, internal to the device, processor 30 (shown in FIG. 1 but not in FIG. 2), all of which are of conventional design. Mouse pad 24 enables stylus 16 to be operated as a conventional computer "mouse" device and phone jack 22 enables the portable computing device to be connected to a (wired) telecommunications channel.

The keyboard as shown in the figure may be built on a small, hand-held base as small as approximately 3 inches square (i.e., 3" by 3"). Note that typing with such a hand-held keyboard requires no hand motion or grip changes, and uses motions very similar to those used in handwriting or in taking shorthand.

A keyboard arrangement in accordance with the present invention may be arrived at by, for example, determining the most commonly occurring sequential letter pairs in English language text and, possibly, the most commonly occurring letter triplets as well. Specifically, the probability that an arbitrarily located two letter sequence in an excerpt of English language text will consist of a given pair of letters may be estimated. This probability may then be compared to a predetermined threshold value, such as 0.006, for example. For most of (i.e., the majority of) the sequences for which the corresponding probability exceeds the threshold, keys representative of the letters in the sequence are placed adjacent to one another. In certain embodiments the "space" character is included as one of the "letters" which comprise the evaluated letter sequences. For example, the sequence "e_" (i.e., the letter "e" followed by a space) is quite common, since many common words end with the letter "e."

In one illustrative embodiment, the predetermined threshold may be determined based on the estimated probabilities of the letter sequences. For example, it may be desirable that the "n" most common letter pairs (or a majority thereof) be represented by adjacent keys. The probabilities of all possible letter pairs may be estimated and the letter pairs may then be listed in descending order of their probabilities. The probability of the "n+1st" listed letter pair may then be used as the predetermined threshold. In this manner, the "n" most common letter pairs will have probabilities which exceed the threshold.

Probabilities of three letter sequences may also be estimated in a similar manner, and these probabilities may be compared to another threshold, such as .002, for example. If the probability of a given triplet (i.e., a three letter sequence) exceeds this threshold, the keys representative of the given sequence may be placed adjacent to each other for a selected number of these sequences. Specifically, a key representative of the first letter of a selected triplet is placed adjacent to a key representative of the second letter of the triplet, and a key representative of the third letter of the triplet is placed adjacent to the key representative of the second letter of the triplet. In this manner, common letter triplets, like the common letter pairs, may be entered quickly by a user of the keyboard (i.e., with minimal hand motion).

In the arrangement of the keys for the illustrative keyboard shown in FIG. 2, for example, probabilities for certain letter pairs and certain letter triplets were estimated and the most commonly occurring sequences were thereby determined. For example, note that representative keys for the common two-letter sequences "ER," "IN" and "TH" are adjacent, as are representative keys for common three-letter sequences "THE" and "INC." Specifically, each of the letter pairs E and R; I and N; H and T; I and T; A and T; E and T; N and O; A and N; E and S; A and R; E and N; O and R; E and H; E and L; A and L; I and S; S and T; D and E; O and T; and C and E was determined to have an estimated probability greater than 0.006. Of these, a majority (actually seventeen out of twenty—all but A and N; E and S; and C and E) were selected, and keys for each selected pair were positioned adjacent to each other on the keyboard shown in FIG. 2. Moreover, each of the letter triplets T, H and E; I, O and N; I, N and G; A,N and D; T, I and O; E, N and T; and E, T and A was determined to have an estimated probability greater than ).002. Of these seven triplets, six (all but A, N and D) were also selected, and keys for each selected triplet were placed adjacent to each other as well.

The above described probabilities for selected letter pairs and triplets may, for example, be estimated based on a statistical analysis of a preselected sample of English language text. That is, conventional statistical analysis techniques may be applied to (preferably) large quantifies of sample textual data to estimate the probability that each possible sequence of letters less than a given length will occur in the text which is to be input through the keyboard. For example, as described above, letter pairs and triplets (i.e., sequences less than 4 characters in length) may be analyzed to determine the most common sequences (i.e., those having probabilities greater than one or more predetermined thresholds).

Where a particular application is envisioned for the use of the keyboard, sample input text for that given application may be advantageously used to produce an improved application-specific keyboard arrangement. Alternatively, however, a standardized keyboard arrangement for all applications may be advantageously produced by using a wide variety of sample textual data. Note, however, that different languages (e.g, Spanish or French as opposed to English) may well have different letter sequence probabilities. Thus, it may not be advantageous to produce a single standard keyboard arrangement for use with different languages.

In the illustrative keyboard of FIG. 2, common letters such as "A" and "E" have been assigned more than one representative key. By providing duplicate keys for the same commonly occurring character, the likelihood that keys included in high probability sequences can be arranged so as to be adjacent is increased. In other words, it will thereby be possible to place more letter pairs (and triplets) adjacent to one another. For example, it has been estimated (assuming general English language text) that with the key arrangement shown in FIG. 2, there is a probability of approximately 50% for each letter to be entered that a key representative of that letter will be adjacent to the previously typed key. Such a probability of sequentially typed keys being adjacent may be determined based on a (preferably large) sample of English language text (as in the above-described method for estimating sequence probabilities). Moreover, such a probability may be used as one possible "quality" measure of a given keyboard. (Other possible quality measures may, for example, take into account the actual distances between sequentially typed keys. Moreover, these distances may be "weighted" depending on the relative location of the respective keys, since it may be faster to move one's hand a given distance between keys in one area of the keyboard than in another area of the keyboard.)

In accordance with one illustrative embodiment, the arrangement of the keys produced in accordance with the principles of the present invention may be further improved by use of an iterative technique which strives to "maximize" a quality measure such as the one described above. For example, the quality measure may be determined for both a given keyboard and for a slightly modified version of that keyboard in which an arbitrarily chosen pair of keys are switched with one another. (The chosen pair of keys may or may not be limited to adjacent keys.) The version of the keyboard with the higher quality measure is retained, and this process is repeated numerous (e.g., thousands of) times. In this manner, a keyboard having a high probability that sequentially typed keys will be adjacent is generated.

In one alternative embodiment incorporating such a maximization technique, the version of the keyboard having the higher quality measure may be retained most, but not all, of the time (i.e., with a high probability less than one). By occasionally retaining the lower quality keyboard instead of the higher quality keyboard, the procedure may advantageously avoid becoming "stuck" at a "local maximum." In yet another alternative embodiment, such a maximization technique may be applied using the above-described quality measure without first performing any particular initial arrangement of the keys (e.g., by starting with a random arrangement). Given a sufficient number of iterations, a keyboard arrangement in accordance with the present invention will likely be produced.

Figure 4:
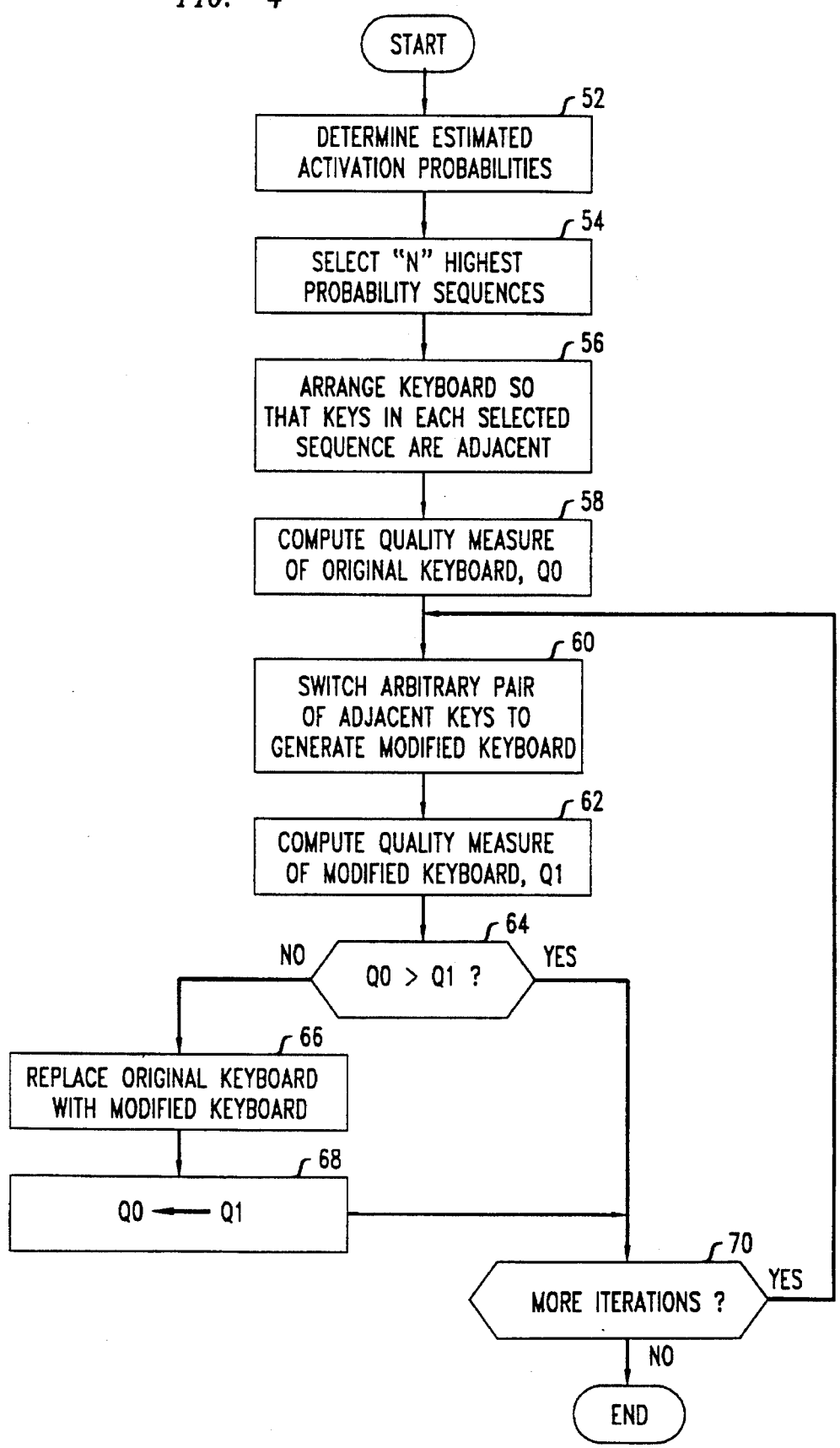
FIG. 4 is a flow diagram of a method of arranging keys on a keyboard in accordance with an illustrative embodiment of the present invention.

FIG. 4 is a flow diagram of a method of arranging keys on a keyboard in accordance with one illustrative embodiment of the present invention. The procedure shown selects all of the sequences of letter pairs having the "N" highest estimated activation probabilities (as described above), arranges the keyboard so that the keys in each of these sequences are adjacent, and then performs the above-described maximization technique.

Specifically, step 52 determines estimated activation probabilities for all two-letter sequences, and step 54 selects all of those sequences having the "N" highest probabilities. (Other embodiments may select less than all, but more than half of the sequences having an estimated activation probability above a given threshold.) Step 56 then arranges the keyboard so that the keys in each of these selected sequences are adjacent. Step 58 computes a quality measure (e.g., the probability that sequentially activated keys are adjacent) for the "original" keyboard, and step 60 generates a "modified" keyboard by switching an arbitrarily chosen pair of adjacent keys. Step 62 computes a quality measure of the modified keyboard and decision 64 compares it to the quality measure of the original keyboard. If the quality measure of the modified keyboard is the greater of the two measures, step 66 replaces the original keyboard with the modified keyboard and step 68 correspondingly updates the quality measure. Decision 70 determines whether the predetermined number of iterations have been performed, and, if not, the procedure returns to step 60 for the next iteration.

In accordance with certain illustrative embodiments of the present invention, the keys may be categorized and correspondingly color-coded to assist the user in key identification. For example, in one embodiment, vowel keys and keys for various portions of the alphabet may be provided in different colors. Alternatively, the keys may be color-coded based on their location on the keyboard. In the illustrative embodiment shown in FIG. 2, for example, the three "tings" of keys (the inner ting, the middle ring and the outer ring) are each color-coded with a different color. By color-coding the letter keys as shown in FIG. 2, once a keyboard user begins to associate each letter with a particular color, it will be easier for him or her to quickly locate the key during typing.

According to certain illustrative embodiments, grooves 32 as shown in FIG. 2 may be cut into the keyboard housing between adjacent keys to provide for guided movement of the stylus between them. In this manner, the speed and accuracy of use of the stylus may be increased.

In addition, lights 34 (e.g., light-emitting-diodes) may be provided between adjacent keys, as is illustrated in the magnified view of a portion of the keyboard of FIG. 2 which is shown in FIG. 3. For example, the sequence of lights (and corresponding keys) representing a given typed word may be illuminated (or flashed) upon its completion. The completion of a word may, for example, be indicated by the typing of a "space" key. That is, upon the typing of a space key, the previous sequence of keystrokes (since the last space key was typed) is presumed to represent a word. By illuminating the lights between the adjacent keys which were typed since the previous space key, a pattern representing that word is illuminated. As an alternative use of lights 34, one or more of the lights between the last key typed and adjacent keys may be illuminated to indicate options for the next character or flashed to indicate a predicted next letter. In alterative embodiments, lights 34 may be positioned within (or beneath) the individual keys, rather than between adjacent keys. These lights may then be used in an analogous manner to the uses described above.

Figure 5:
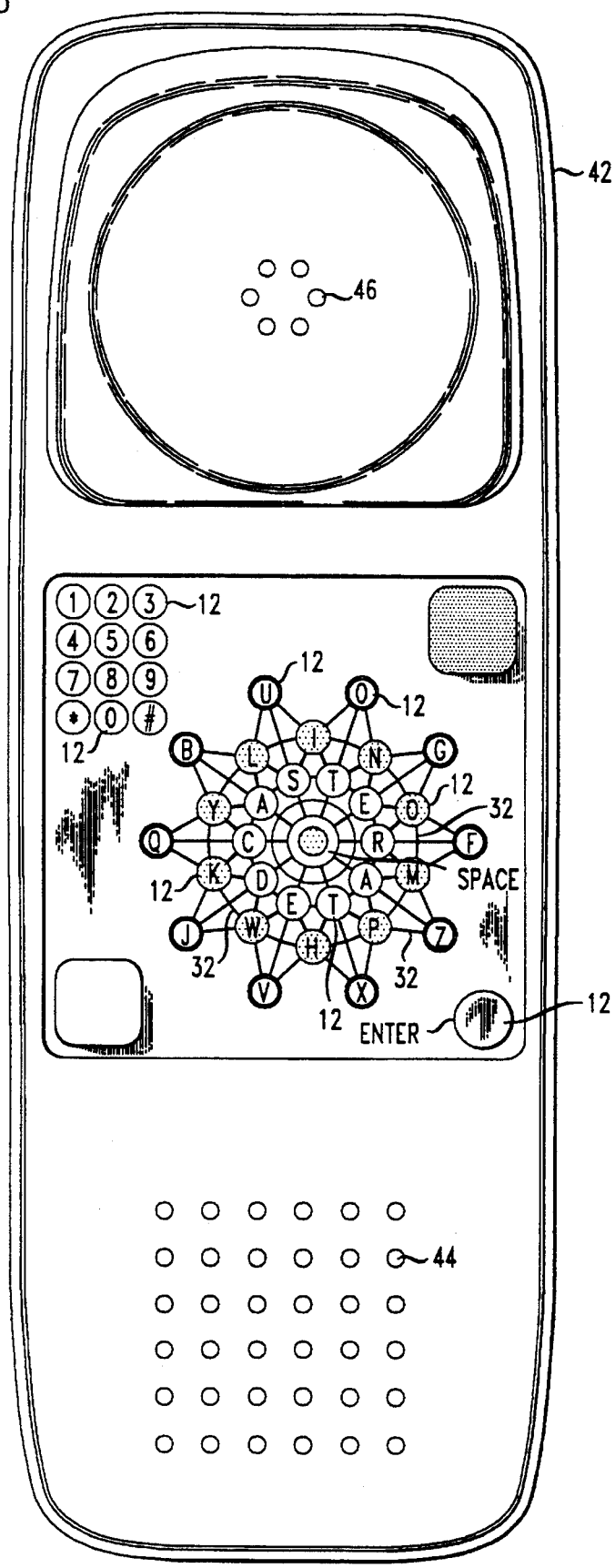
FIG. 5 shows a telecommunications device comprising a keyboard having keys arranged in accordance with an illustrative embodiment of the present invention.

FIG. 5 shows a telecommunications device comprising a keyboard having keys arranged in accordance with an illustrative embodiment of the present invention. Specifically, the device shown in the figure is a telephone hand-set comprising housing 42 which includes a full alphabetic keyboard having keys 12 arranged in a similar manner to the keyboard included in the portable computing device of FIG. 2. The telephone hand-set of FIG. 5 also includes microphone 44 and loudspeaker 46. Telecommunications devices containing alphabetic keyboards (not arranged in accordance with the present invention) rare conventional. For example, telecommunications devices for the deaf (TDDs) commonly provide a standard QWERTY keyboard for the typing of messages which may be transmitted across a conventional telecommunications network. Keys 12 of the telephone keyboard shown in FIG. 5 may be operated with use of one or more fingers or, alternatively, with a hand-held mechanical (e.g., pen-like) stylus.

Although the above discussion has described illustrative embodiments of the present invention in which the input device is a stylus-based keyboard, the present invention is not limited to keyboards or devices containing keyboards. Any input device having a plurality of discrete areas, each area adapted to be activated by operatively coupling a stylus thereto, is intended to be included within the scope of the present invention. In addition, the operative coupling may be electrical (e.g., capacitive or electrostatic), magnetic, optical (where, for example, the stylus may be a "light-pen") or mechanical (as it is in the case of a keyboard). Moreover, the stylus used to operate the input device may be a mechanical (e.g., hand-held) pen-like object or it may even be a human finger. For example, a conventional computer mouse may be modified so as to include keys (representing alphabetic letters) adapted to be activated by the use of one or more fingers, wherein the keys have been arranged in accordance with the present invention—such a device is included within the scope of the present invention. Moreover, conventional-style keyboards (i.e., those intended to be operated by the use of one or more fingers from one or both hands) are included within the scope of the present invention as well.

As used herein, the phrase "portable computing device" is intended to include any portable device comprising a processor, a display, an input device and a housing therefor, including portable and laptop computers, as well as the class of devices commonly referred to as personal communicators (or personal digital communicators). These latter devices commonly include modems or similar devices for transmitting and receiving data across a telecommunications channel, and may, in particular, further include means for wireless (e.g., cellular) communication. (The use of the term "processor" should not be construed to refer exclusively to hardware capable of executing software.)

In addition, the phrase "telecommunications device" as used herein is intended to include any telephonic instrument which includes a keyboard. As such, conventional desk-top or other corded telephones, cordless and cellular telephones, as well as facsimile machines, all fall within the scope of the present invention if they include a keyboard arranged in accordance therewith.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

We claim:

1. A method of arranging a plurality of discrete areas on an information input device, the input device adapted for input of natural language text, the discrete areas representative of characters, said characters combinable in sequence to produce the natural language text, the discrete areas adapted to be activated by operatively coupling a stylus thereto, the method comprising the steps of:

determining, for one or more sequences of two or more of said characters, an estimated probability of the discrete areas representing said characters being activated in sequence, said probability being a function of said natural language text;

selecting a majority of the sequences which have been determined to have a corresponding probability higher than a predetermined threshold; and arranging the discrete areas on the input device as a function of said estimated probabilities, the discrete areas representing characters included in each of the selected sequences being positioned adjacent to each other on the input device.

2. The method in accordance with claim 1 wherein one or more of said characters are represented by more than one of said discrete areas.

3. The method in accordance with claim 1 wherein the arranging step comprises arranging the discrete areas on the input device in a plurality of concentric geometric figures.

4. The method in accordance with claim 1 wherein the natural language text comprises English language text and wherein the characters include alphabetic letters A through Z.

5. The method in accordance with claim 1 wherein the step of determining the estimated probabilities comprises performing a statistical analysis on a preselected sample of said natural language text.

6. The method in accordance with claim 1 further comprising the steps of:

computing a first quality measure as a function of said arrangement of discrete areas resulting from the arranging step, the first quality measure reflecting a probability that successive characters in said natural language text are represented by adjacent discrete areas of said information input device comprising said arrangement of discrete areas;

modifying said arrangement by switching the positions of two or more of said discrete areas;

computing a second quality measure as a function of said modified arrangement, the second quality measure reflecting a probability that successive characters in said natural language text are represented by adjacent discrete areas of said information input device comprising said modified arrangement of discrete areas; and choosing one of said arrangement and said modified arrangement as a function of said first and second quality measures.

7. An information input device adapted for input of English language text, the input device comprising a plurality of discrete areas representative of characters including the alphabetic letters A through Z, the discrete areas adapted to be activated by operatively coupling a stylus thereto, wherein the input device comprises at least eleven pairs of adjacent discrete areas, each of said pairs of adjacent discrete areas comprising areas representative of a pair of characters selected from the group consisting of E and R; I and N; H and T; I and T; A and T; E and T; N and O; A and N; E and S; A and R; E and N; O and R; E and H; E and L; A and L; I and S; S and T; D and E; O and T; and C and E.

8. The input device in accordance with claim 7 wherein the input device further comprises at least two triplets of discrete areas, each discrete area in each one of said triplets being adjacent to another discrete area in the one of said triplets, each of said triplets of discrete areas comprising areas representative of a triplet of characters selected from the group consisting of T, H and E; I, O and N; I, N and G; A,N and D; T, I and O; E, N and T; and E, T and A.

9. The input device in accordance with claim 7 wherein one or more of said characters are represented by more than one of said discrete areas.

10. The input device in accordance with claim 7 wherein the discrete areas are arranged on the input device in a plurality of concentric geometric figures.

11. The input device in accordance with claim 7 wherein the distance between any two of said discrete areas does not exceed four inches.

12. The input device in accordance with claim 7 wherein the discrete areas are divided into a plurality of categories as a function of the characters represented thereby, and wherein the discrete areas are color-coded with a corresponding plurality of colors based on their respective category.

13. The input device in accordance with claim 7 wherein the discrete areas are divided into a plurality of categories as a function of their location on the input device, and wherein the discrete areas are color-coded with a corresponding plurality of colors based on their respective category.

14. The input device in accordance with claim 7 wherein the input device comprises a keyboard and each of the discrete areas comprises a key, and wherein the keys are adapted to be activated by touching the stylus thereto.

15. The input device in accordance with claim 14 wherein the keyboard comprises a housing having one or more grooves, each groove cut into the housing between two of said keys for guided movement of the stylus therebetween.

16. The input device in accordance with claim 14 wherein the keyboard comprises a housing having one or more lights coupled thereto, each light associated with one or more of said keys.

17. The input device in accordance with claim 16 wherein the lights comprise light-emitting-diodes.

18. The input device in accordance with claim 16 wherein the plurality of keys includes a space key for separating sequences of one or more of said keys, and wherein one or more of the lights associated with keys in a given sequence of two or more keys is adapted to be illuminated when the given sequence of keys followed by the space key has been activated.

19. The input device in accordance with claim 16 wherein one or more of the lights associated with a given key is adapted to be illuminated when the given key has been activated.

20. A portable computing device comprising:
a housing;
a processor contained within the housing;
a display device electrically coupled to the processor; and
an information input device adapted for input of English language text, the input device comprising a plurality of discrete areas representative of characters including the alphabetic letters A through Z, the discrete areas adapted to be activated by operatively coupling a stylus thereto, wherein the input device comprises at least eleven pairs of adjacent discrete areas, each of said pairs of adjacent discrete areas comprising areas representative of a pair of characters selected from the group consisting of E and R; I and N; H and T; I and T; A and T; E and T; N and O; A and N; E and S; A and R; E and N; O and R; E and H; E and L; A and L; I and S; S and T; D and E; O and T; and C and E.

21. The portable computing device in accordance with claim 20 wherein the input device further comprises at least two triplets of discrete areas, each discrete area in each one of said triplets being adjacent to another discrete area in the one of said triplets, each of said triplets of discrete areas comprising areas representative of a triplet of characters selected from the group consisting of T, H and E; I, O and N; I, N and G; A,N and D; T, I and O; E, N and T; and E, T and A.

22. The portable computing device in accordance with claim 20 wherein one or more of said characters are represented by more than one of said discrete areas.

23. The portable computing device in accordance with claim 20 wherein the discrete areas are arranged on the input device in a plurality of concentric geometric figures.

24. The portable computing device in accordance with claim 20 wherein the distance between any two of said discrete areas does not exceed four inches.

25. The portable computing device in accordance with claim 20 wherein the discrete areas are divided into a plurality of categories as a function of the characters represented thereby, and wherein the discrete areas are color-coded with a corresponding plurality of colors based on their respective category.

26. The portable computing device in accordance with claim 20 wherein the discrete areas are divided into a plurality of categories as a function of their location on the input device, and wherein the discrete areas are color-coded with a corresponding plurality of colors based on their respective category.

27. The portable computing device in accordance with claim 20 wherein the input device comprises a keyboard and each of the discrete areas comprises a key, and wherein the keys are adapted to be activated by touching the stylus thereto.

28. The portable computing device in accordance with claim 27 wherein one or more grooves are cut into the housing, each groove cut into the housing between two of said keys for guided movement of the stylus therebetween.

29. The portable computing device in accordance with claim 27 further comprising one or more lights coupled to the housing, each light associated with one or more of said keys.

30. The portable computing device in accordance with claim 29 wherein the lights comprise light-emitting-diodes.

31. The portable computing device in accordance with claim 29 wherein the plurality of keys includes a space key for separating sequences of one or more of said keys, and wherein one or more of the lights associated with keys in a given sequence of two or more keys is adapted to be illuminated when the given sequence of keys followed by the space key has been activated.

32. The portable computing device in accordance with claim 29 wherein one or more of the lights associated with a given key is adapted to be illuminated when the given key has been activated.

33. A telecommunications device comprising a housing;

a microphone contained within the housing for converting acoustic signals to electrical signals for transmission through a telecommunications network;

a loudspeaker contained within the housing for converting electrical signals transmitted through the telecommunications network to acoustic signals; and an information input device adapted for input of English language text, the input device comprising a plurality of discrete areas representative of characters including the alphabetic letters A through Z, the discrete areas adapted to be activated by operatively coupling a stylus thereto, wherein the input device comprises at least eleven pairs of adjacent discrete areas, each of said pairs of adjacent discrete areas comprising areas representative of a pair of characters selected from the group consisting of E and R; I and N; H and T; I and T; A and T; E and T; N and O; A and N; E and S; A and R; E and N; O and R; E and H; E and L; A and L; I and S; S and T; D and E; O and T; and C and E.

34. The telecommunications device in accordance with claim 33 wherein the input device further comprises at least two triplets of discrete areas, each discrete area in each one of said triplets being adjacent to another discrete area in the one of said triplets, each of said triplets of discrete areas comprising areas representative of a triplet of characters selected from the group consisting of T, H and E; I, O and N; I, N and G; A,N and D; T, I and O; E, N and T; and E, T and A.

35. The telecommunications device in accordance with claim 33 wherein one or more of said characters are represented by more than one of said discrete areas.

36. The telecommunications device in accordance with claim 33 wherein the discrete areas are arranged on the input device in a plurality of concentric geometric figures.

37. The telecommunications device in accordance with claim 33 wherein the distance between any two of said discrete areas does not exceed four inches.

38. The telecommunications device in accordance with claim 33 wherein the discrete areas are divided into a plurality of categories as a function of the characters represented thereby, and wherein the discrete areas are color-coded with a corresponding plurality of colors based on their respective category.

39. The telecommunications device in accordance with claim 33 wherein the discrete areas are divided into a plurality of categories as a function of their location on the keyboard, and wherein the discrete areas are color-coded with a corresponding plurality of colors based on their respective category.

40. The telecommunications device in accordance with claim 33 wherein the input device comprises a keyboard and each of the discrete areas comprises a key, and wherein the keys are adapted to be activated by touching the stylus thereto.

41. The telecommunications device in accordance with claim 40 wherein one or more grooves are cut into the housing, each groove cut into the housing between two of said keys for guided movement of the stylus therebetween.

42. The telecommunications device in accordance with claim 40 further comprising one or more lights coupled to the housing, each light associated with one or more of said keys.

43. The telecommunications device in accordance with claim 42 wherein the lights comprise light-emitting-diodes.

44. The telecommunications device in accordance with claim 42 wherein the plurality of keys includes a space key for separating sequences of one or more of said keys, and wherein one or more of the lights associated with keys in a given sequence of two or more keys is adapted to be illuminated when the given sequence of keys followed by the space key has been activated.

45. The telecommunications device in accordance with claim 42 wherein one or more of the lights associated with a given key is adapted to be illuminated when the given key has been activated.

* * * * *